March 11, 1958 F. KESSLER 2,826,648

PULSE ANALYZER CIRCUIT

Filed March 21, 1955 6 Sheets-Sheet 1

*INVENTOR.*
FRANK KESSLER
BY [signature]
ATTORNEY

March 11, 1958 F. KESSLER 2,826,648

PULSE ANALYZER CIRCUIT

Filed March 21, 1955 6 Sheets-Sheet 2

March 11, 1958 F. KESSLER 2,826,648

PULSE ANALYZER CIRCUIT

Filed March 21, 1955 6 Sheets-Sheet 5

2,826,648
Patented Mar. 11, 1958

2,826,648

PULSE ANALYZER CIRCUIT

Frank Kessler, Los Angeles, Calif., assignor, by mesne assignments, to General Dynamics Corporation, a corporation of Delaware Application March 21, 1955, Serial No. 495,500

15 Claims. (Cl. 179—175.2)

This invention relates to telephone testing equipment and more particularly to means for testing a telephone dial to analyze the characteristics of each digit pulse and each party identification pulse.

In the art of automatic telephony, it is necessary to provide a plurality of pulses, each of which must have certain predetermined characteristics. Usually, these pulses are produced by either a key sender or a subscriber dial. It would be desirable to provide a pulse analyzer circuit by means of which any individual pulse in a pulse train may be analyzed to determine its particular characteristics and to determine how that particular pulse varies from certain preconceived standards.

One object of this invention is to provide a new and improved pulse analyzing circuit.

Another object of this invention is to provide means for analyzing each individual pulse in a given pulse train to determine the characteristics of that pulse.

A further object of this invention is to provide means for analyzing the characteristics of party line identification pulses.

The objects of my invention are accomplished by providing means for storing a charge on a capacitor to indicate the total time of one pulse period, to store a charge on another capacitor to indicate the duration of one portion of the same pulse period, and then to provide means for reading these stored charges in terms of either milliseconds or pulses per second to determine the ratio and speed of a telephone dial.

The following specification and attached drawings show in detail one way of accomplishing the above cited objects. That is, means is provided in the form of a chain of marking relays to indicate or select which pulse in a particular train of dial pulses is to be analyzed. After this chain of marking relays is set, a charge is stored on a capacitor to indicate the duration of the chosen pulse and a charge is stored on a second capacitor to indicate the duration of the open period of the chosen pulse. Each of these charged capacitors is then connected in turn to the floating grid of a vacuum tube voltmeter, the dial of which is then deflected by an amount that is indicative of the characteristics of the particular pulse that was measured. In a similar manner a party identification pulse may be used to store still another charge so that its characteristics may be analyzed.

It is thought that these and other objects of this invention will be obvious from a study of the attached drawings wherein.

Figure 1:
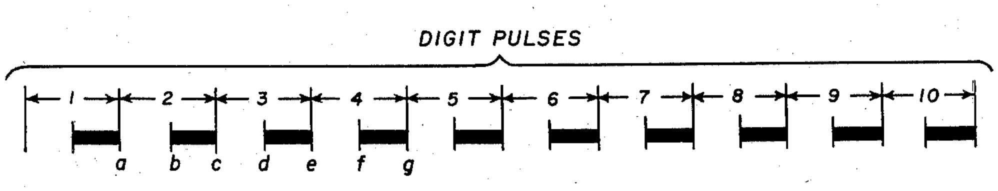
Fig. 1 shows a time chart indicative of the pulses that occur in a digit pulse train.

In the drawings, the source of potential is shown by plus (+) and minus (—) signs. As in the case of most telephone systems, the (+) side of the office battery is described as connected with ground. Hence, the terms "(—) battery" and "ground (+)" are used. It should be understood, however, that either this or any other suitable source of potential may be used.

Briefly, dial **200*a* which is to be tested is located at telephone 200. It may be operated in a conventional manner to seize the pulse analyzer circuit over a switch train 201. Following seizure, dial 200*a* is operated once and counting relays determine the number of digit pulses received and set marking relays in accordance therewith to provide means for determining the particular pulse in a given pulse train that is to be analyzed. The dial at telephone 200 is operated a second time and, during the transmission of digit pulses responsive thereto, a charge is stored on each of the capacitors C31 and C32**. These charges indicate both the speed of the dial during any given pulse and the make-to-break ratio of that pulse.

*Detailed description*

The circuit shown is a pulse analyzer which may be used to test any particular pulse in a digit pulse train. For this purpose, two digit pulse trains may be transmitted into the pulse analyzer circuit. The first digit pulse train sets a marking chain while the second digit pulse train utilizes this marking to store charges on various capacitors representative of the pulse to be analyzed. Then, these charges may be read in terms of milliseconds to determine the duration of that pulse. Also, means are provided to determine the speed of any pulse train.

Figure 2:
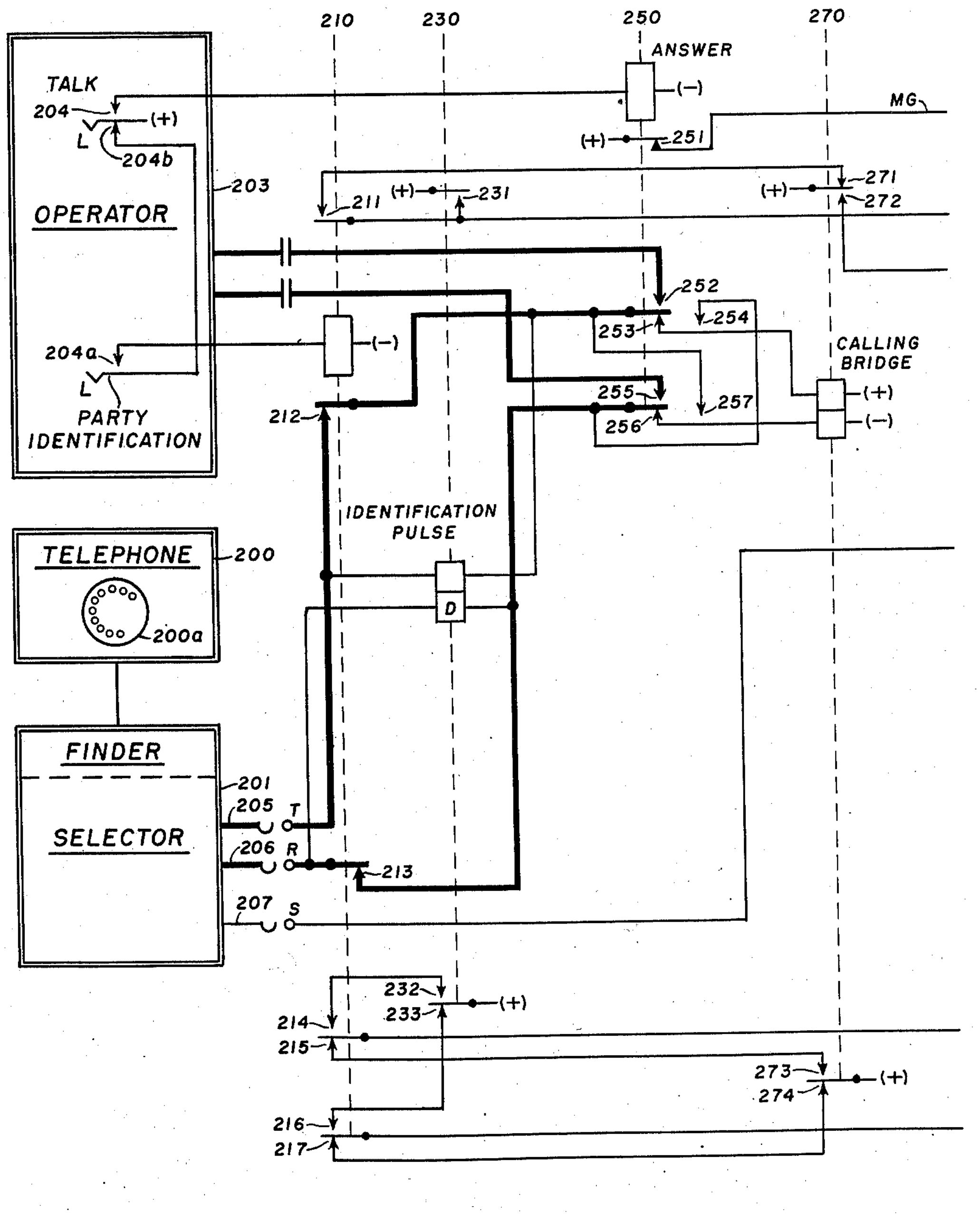
Figs. 2–6 show a pulse analyzer circuit.
Figure 3:
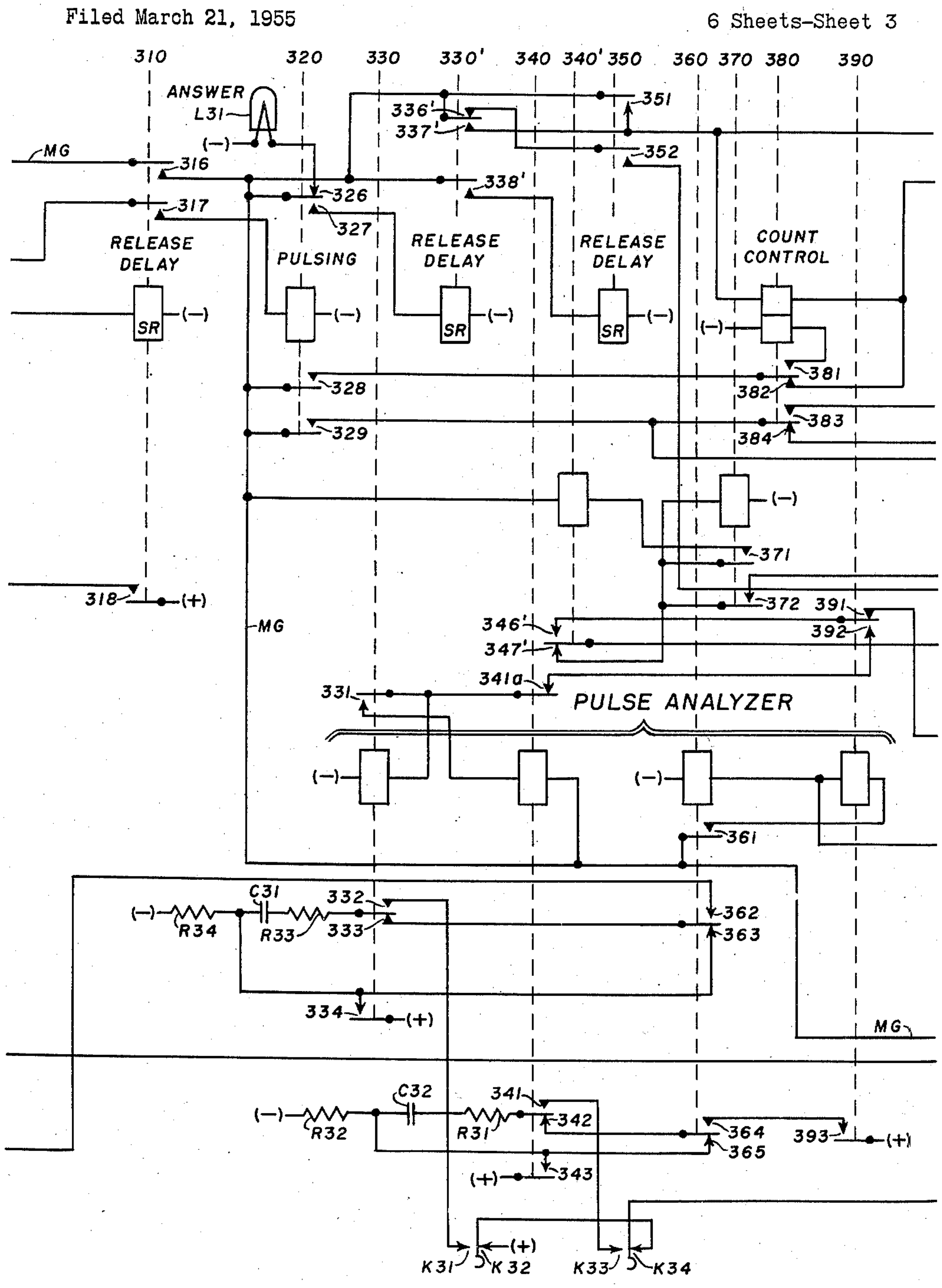
Figure 4:
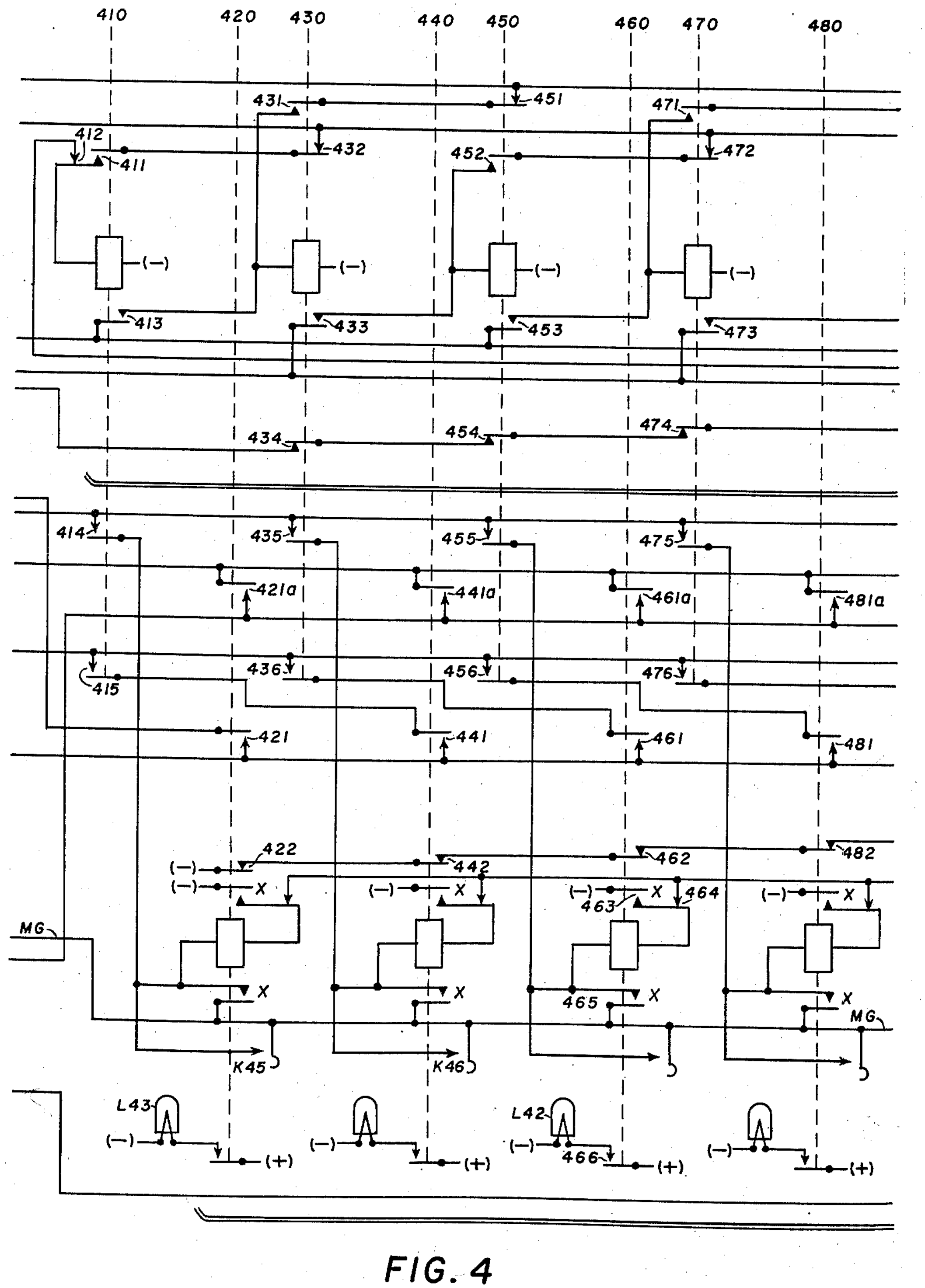
Figure 5:
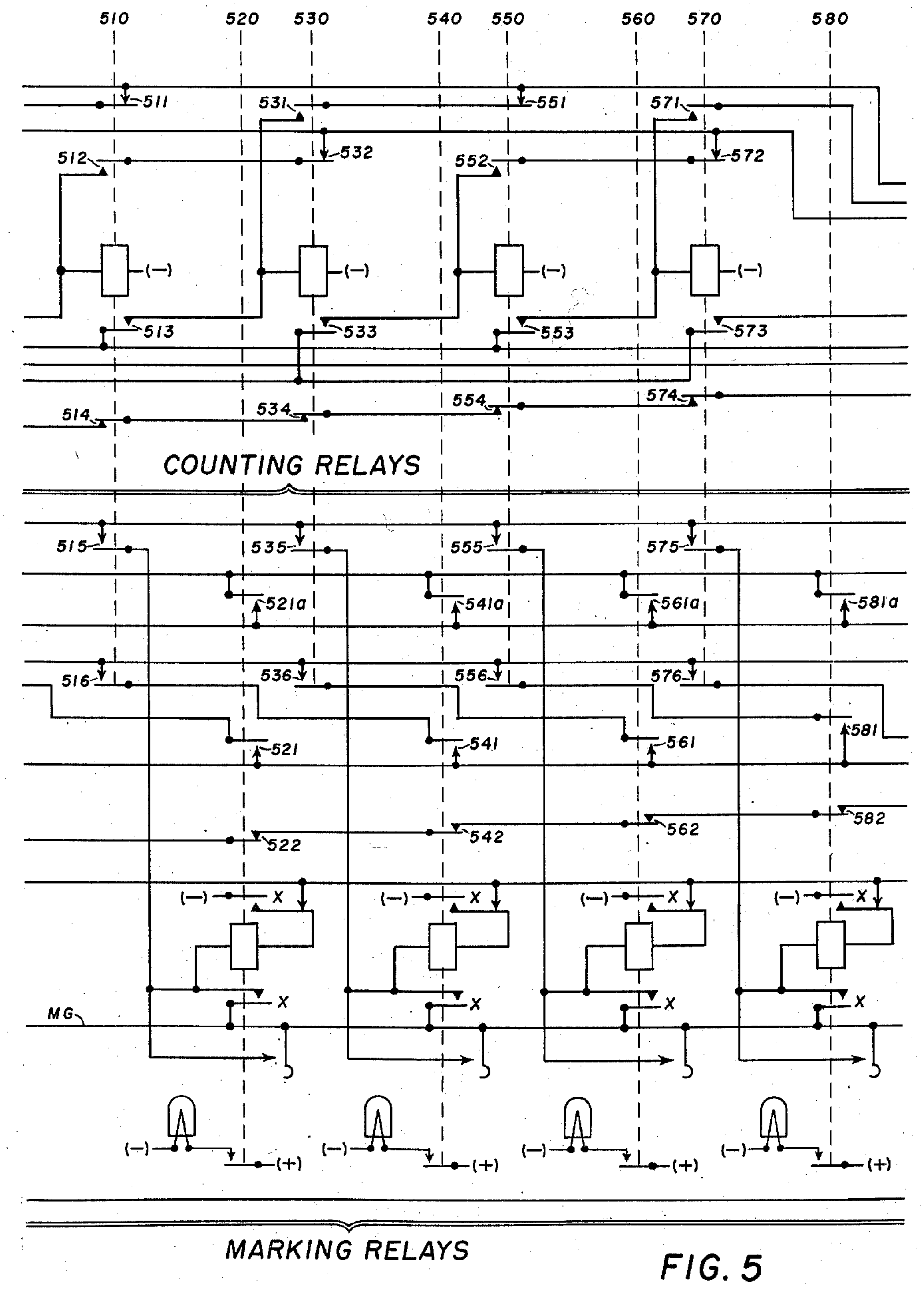

*Seizure.*—Figure 2 shows a telephone 200 which has access to a finder-selector link 201. Brushes 205, 206 and 207 of the selector are positioned in any well known manner to seize conductors T, R and S which connect with the pulse analyzer circuit. Battery and ground potentials are returned to hold the calling switch train and to energize the calling subscriber's transmitter. For example, a circuit may now be traced from ground (+) through the upper winding of calling bridge relay 270, contacts 253, 212, conductor T, brush 205, finder-selector link 201, telephone 200, and return through finder-selector link 201, brush 206, conductor R, contacts 213, 256 and the lower winding of calling bridge relay 270 to (—) battery.

Calling bridge relay 270 operates. The primary purpose of this relay is to respond to and repeat digit pulses at contacts 274 and 271. Contacts 273 close; however, they have no effect since none of the marking relays are operated at this time and thus contacts **421*a* and similar contacts are open. Contacts 272 close to operate release delay relay 310** over an obvious circuit.

Release delay relay 310 operates. The purpose of this relay is to hold equipment operated during the intra-digit pulse time when calling bridge relay 270 is released to repeat pulses. More particularly, contacts 316 close to extend a ground (+) marking from contacts 251 over conductor MG. This is the ground marking that holds most of the relays in the circuit when they are locked in their operated position. Therefore, hereinafter, this marking will be called "master ground" and the conductor to which it is connected will be called "the master ground or MG conductor." Contacts 316 further complete a circuit from conductor MG through contacts 326 to light answer lamp L31. This lamp is a signal to the test operator that a call is awaiting his attention. Contacts 317 close; however, they are of no effect at this time because contacts 271 are held open by operated calling bridge relay 270. Contacts 318 close to apply a ground (+) marking to sleeve conductor S to hold the finder-selector link 201 in its operated condition and to guard the pulse analyzer circuit as busy against seizure by any other finder-selector link.

*Answer.*—Nothing further happens until the operator responds to the lighting of answer lamp L31 by operating talk key 204. The operator and the calling subscriber may then converse. In greater detail, key 204 closes an obvious circuit to operate answer relay 250. Contacts 251 open to remove master ground (+) from conductor MG and to extinguish lamp L31. Contacts 252 and 255 close to connect the talking conductors T and R between operator 203 and telephone 200. To give answer supervision, contacts 253 and 256 open while contacts 254 and 257 close, thereby reversing the direction of battery flow extended through calling bridge relay 270 to the finder and selector link over conductors T and R. More specifically, the talking battery now extends from (—) battery through the lower winding of calling bridge relay 270, operated contacts 257 and 212 to tip conductor T, while ground extends through the upper winding of relay 270, operated contacts 254 and 213 to ring conductor R.

The subscriber or test man at telephone 200 converses with operator 203 and it is determined that a test is to be made on the telephone dial. Therefore, operator 203 returns talk key 204 to normal. Relay 250 restores and ground (+) is reconnected to conductor MG.

*Marking.*—The person at subscriber's station 200 transmits a suitable number of digit pulses to set the marking relays after which a second series of digit pulses may be sent so that the particular pulse corresponding to that registered by the marking relay is analyzed to determine its characteristics.

In greater detail, the pulses are in the form of open loop breaks which means that the bridge across conductors T and R is broken at station 200 a number of times depending upon the particular digit that is transmitted. Calling bridge relay 270 releases responsive to each break in this loop. In doing so, it opens contacts 272 and closes contacts 271. The energizing circuit for release delay relay 310 is broken each time that contacts 272 open; however, this is of no effect because relay 310 continues to hold in an operated position due to its slow release characteristics. Responsive to each closure of contacts 271, pulsing relay 320 operates to connect master ground from conductor MG to a second release delay relay 330'. Relay 320 is merely a slave to calling bridge relay 270 and is used to improve pulsing characteristics. Release delay relay 330' operates and continues to hold throughout pulsing due to its slow release characteristics despite the fact that contacts 327 open repeatedly. At the end of pulsing, contacts 327 remain open long enough for relay 330' to completely deenergize and release. The release of this relay is used to mark the end of a complete digit pulse train. A circuit is prepared at contacts 337' for the chain of counting relays and a circuit is completed at contacts 338' for operating a second release delay relay 350. The purpose of this relay is to provide a brief interval between release of relay 330' and relay 350 during which a relay in the marking chain may be locked in an operated condition. Contacts 352 close to prepare this locking path.

Returning now to the operation of pulsing relay 320 which responds to digit pulses as a slave to calling bridge relay 270, contacts 328 and 329 pulse to control operation of the counting relays. In greater detail, ground (+) is extended from contacts 251 over master ground conductor MG, closed contacts 316, 329, 434, 454, 474, 514, 534, 554, 574, 614, 633, 412 and the winding of relay 410 to (—) battery. Counting relay 410 operates and closes make-before-break contacts 411 while opening contacts 412. Relay 410 now locks operated over the circuit which may be traced from (—) battery through the winding of relay 410, contacts 411, 432, the upper winding of count control relay 380 (which operates), operated contacts 351, 316, conductor MG and contacts 251 to master ground (+).

The circuit is now ready to receive the second digit pulse. Again, pulsing relay 320 operates when contacts 271 close responsive to a digit pulse. Responsive thereto, contacts 328 close to complete a locking circuit to count control relay 380 via contacts 381, 328, 316 and 251. The purpose of this locking path is to prevent the release of count control relay 380 until after pulsing relay 320 has released following termination of the second digit pulse. Contacts 329 reclose on the second pulse to complete a circuit to energize counting relay 430. This circuit may be traced from (—) battery through the winding of relay 430, contacts 413, 383, 329, 316 and 251 to master ground (+). Counting relay 430 operates and locks at its upper contacts 431 through contacts 451, 351, 316 and 251 to ground (+). Relay 410 releases when contacts 432 open to break its locking circuit. Open contacts 432 also break the circuit through the upper winding of count control relay 380; however, it continues to be held operated through its lower winding due to the path via contacts 381, 328, 316 and 251. Pulsing relay 320 releases at the end of the second pulse and opens contacts 328 to release count control relay 380.

Relay 450 is operated on the third pulse over the circuit which may be traced from (—) battery through the winding of relay 450, contacts 433, 384, 329, 316 and 251 to ground (+). When relay 450 operates, it opens its contacts 451 thereby releasing counting relay 430. Contacts 452 close to complete a locking circuit for relay 450 from (—) battery through contacts 452, 472, the upper winding of control relay 380 (which operates), contacts 351, 316 and 251 to ground (+). The counting relay chain is now in a condition similar to that when relay 410 was operated on the first pulse.

In a similar manner, each of the counting relays may be operated in turn depending upon the number of digit pulses that are received. Assuming that only three digit pulses were received, pulsing relay 320 does not reenergize within the slow release period of relay 330' Therefore, after contacts 327 have been open for a brief interval, release delay relay 330' restores opening contacts 338' so that relay 350 restores. However, it also has a slow release period so that there will be a short time interval between the release of relays 330' and 350. During this brief interval a circuit is completed from master ground on contacts 251 over master ground conductor MG, contacts 316, 336', 352, 455 (because only three digit pulses were received), the winding of relay 460 to (—) battery by way of contacts 464, 642, 622, 582, 562, 542, 522, 482, 462, 442 and 422. Relay 460 operates and opens its original energizing circuit at contacts 464 while closing a locking circuit at contacts 463 and 465. Contacts 466 close to light lamp L42 as an indication that the third digit pulse is to be energized.

This description was made under the assumption that only three digit pulses were received. If, however, some other number of digit pulses had been received, a different one of the marking relays would have been operated. For example, if seven digit pulses had been received, relay 550 would have remained operated briefly and a circuit would have been completed through contacts 555 to operate marking relay 560.

After the brief time interval marked by its slow release characteristics, release delay relay 350 restores and the counting chain is returned to normal. That is, relay 450 was locked-operated over the path which may be traced from (—) battery through the winding of relay 450, contacts 452 and 472, the upper winding of count control relay 380, contacts 351, 316 and 251 to master ground (+). This circuit is now broken at contacts 351.

A circuit is now complete for operating relay 370. This circuit may be traced from (—) battery through the winding of relay 370, contacts 347', **461*a*, 215 and 273 to ground (+). Relay 370** operates and locks at its contacts 371 over a circuit which may be traced from (−) battery through the winding of relay 370, contacts 371, the winding of relay 340′ (which operates when relay 270 restores on its first pulse), contacts 316 and 251 to master ground (+). When relay 340′ operates, contacts 346′ close to complete a path for preparing relay 360. More will be said about this feature presently.

*Pulse analysis.*—The circuit is now prepared to receive the next digit pulse train which may be sent from telephone station 200. Fig. 1 is a graphic representation of a train of ten digit pulses which is the full complement of a standard telephone dial. Assuming that less than ten pulses are transmitted, this graph would end at some intermediate point, for example at point *g* in a four pulse train. The primary purpose of the subject circuit is to measure the duration of the total time required for a given pulse period and the time required for the open portion of the pulse period. For example, in Fig. 1 the total time for the third pulse period extends from point *c* to point *e*, while the open period during which relay 270 is released and contacts 271 and 274 are closed extends from point *c* to point *d*.

Since it is assumed that three digits were received on the first pulse train, relay 460 is locked in an operated position at this time. Relays 410 and 430 respond to the first two digit pulses in the manner described above in the section entitled "Marking." At the end of the open period of the second digit pulse (point *b*, Fig. 1), a circuit is completed from ground (+) at operated contacts 273 through contacts 215, 461*a*, 346′, 391, 436, 461, and the winding of relay 360 to (−) battery causing it to operate and lock to master ground via (−) battery, the windings of relays 360 and 390 in series, operated contacts 361, master ground conductor MG, contacts 316 and 251 to ground (+). Relay 390 does not operate at this time because of the shunt circuit wherein ground is applied to both sides of its windings. For example, the right side of the winding may be traced to alternate ground (+) through contacts 361, 316 and 251, while the left side of the winding may be traced through contacts 461, 436, 391, 346′, 461*a*, 215 and 273 to ground (+).

Figure 8:
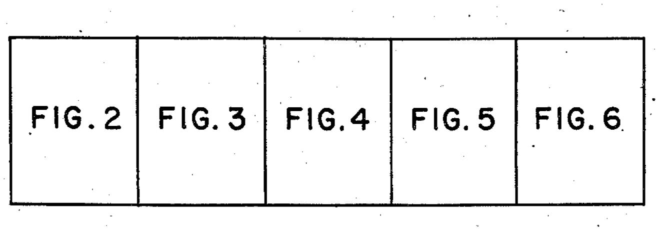
Fig. 8 shows the manner in which Figs. 2–6 should be joined to provide a complete and understandable circuit.

The circuit is now prepared to store a charge indicative of the third digit pulse. That is, when contacts 273 open (point *c*, Fig. 1), the shunt to relay 390 is removed and it operates in the locking circuit of relay 360. Capacitor C32 starts to store a charge at a time corresponding to point *c*, Fig. 8, when relay 390 closes contacts 393, the charging circuit being from ground (+) through contacts 393, 364, 342, resistor R31, capacitor C32, and resistor R32 to (−) battery. This current is to continue throughout the total period of the third pulse, points *c–e* of Fig. 1. While contacts 274 are closed, a charging current is conducted from ground (+) through contacts 274, 217, 362, 333, resistor R33, capacitor C31, and resistor R34 to (−) battery. This current is to continue only during the open period of the third pulse, points *c–d*, Fig. 1.

At the termination of the open period of the third digit pulse, point *d*, Fig. 1, calling bridge relay 270 reoperates and opens contacts 274 thereby terminating the charging current through capacitor C31; hence, the charge built upon capacitor C31 is indicative of the length of time that contacts 274 were closed.

When contacts 273 of calling bridge relay 270 close at the end of the open period in the third digit pulse, point *d*, Fig. 1, a circuit is completed to operate relay 330. The purpose of relay 330 is to break still another point in the charging circuit to capacitor C31 at contacts 333 so that no additional charge may be added when calling bridge relay 270 releases next. This circuit may be traced from (−) battery through the winding of relay 330, contacts 341*a*, 392, 346′, 461*a*, 215 and 273 to ground (+). Relay 330 operates and closes contacts 334 and 332 while opening contacts 333 and preventing further charging of capacitor C31; however, nothing further happens to the charge on the capacitor at this time because key contacts K31 are open. Contacts 331 close; however, relay 340 does not operate at this time since both sides of its windings are connected to ground (+). This shunt circuit may be traced beginning at master ground (+) applied through contacts 251, 316, the winding of relay 340, contacts 331, 341*a*, 392, 346′, 461*a*, 215 and 273 to ground (+). At the end of the third pulse, point *e*, Fig. 1, this shunt is removed because calling bridge relay 270 releases to open contacts 273.

Relay 340 operates in series with locked relay 330, this circuit being traced from (−) battery through the winding of relay 330, contacts 331, the winding of relay 340, master ground conductor MG, contacts 316 and 251 to ground (+). Relay 340 operates and terminates the charging current applied to capacitor C32 by opening contacts 342. Thus, it is seen that the charge left on capacitor C32 is an indication of the total make and break period for the third pulse, *c* to *e*, Fig. 1. Contacts 341 close to prepare a circuit for reading this charge. Relay 340 also opens contacts 341*a*, thereby preventing any further operation of relay 330 responsive to subsequent operation of calling bridge relay 270.

Figures 6, 7:
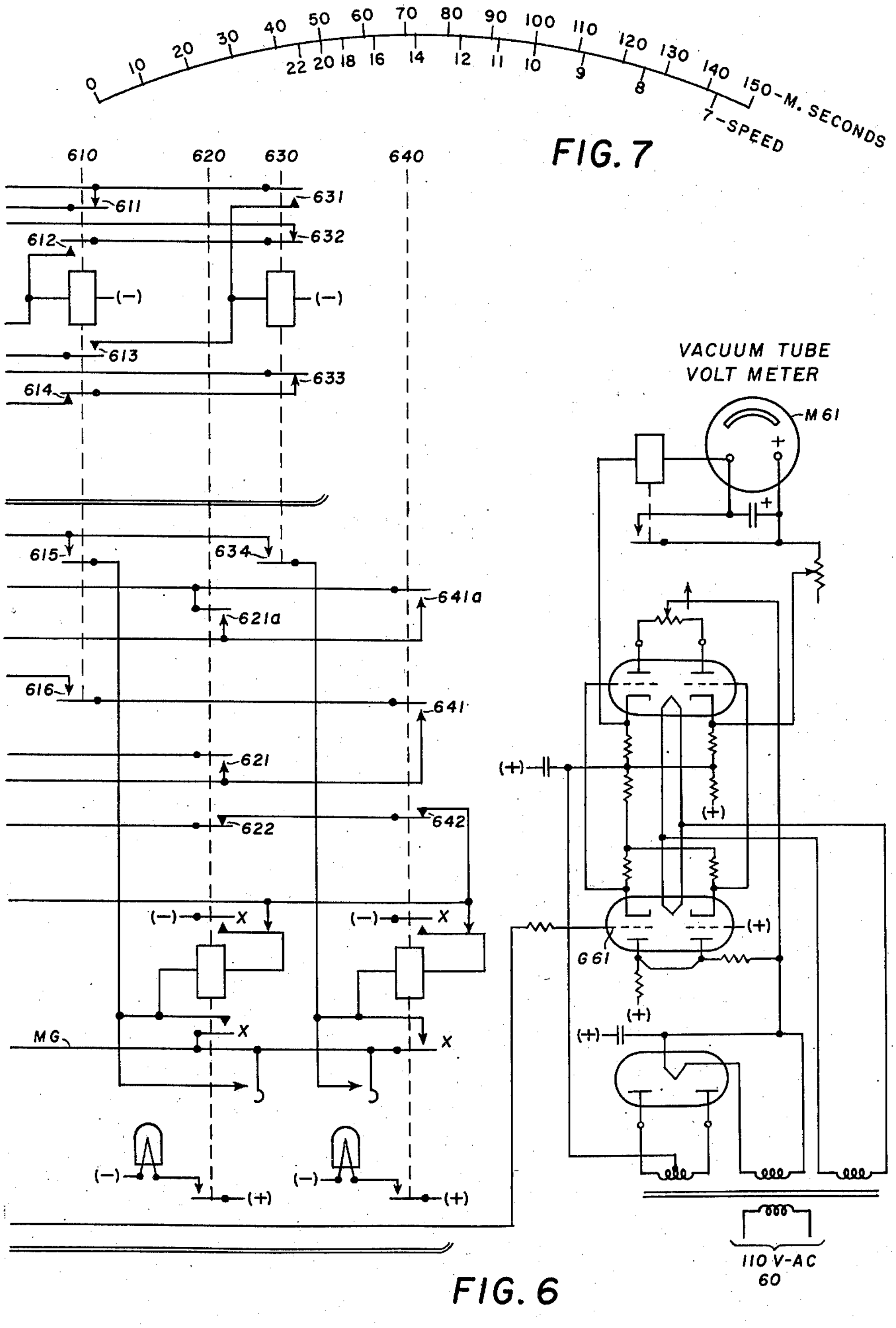
Fig. 7 shows the manner in which the dial of a vacuum tube voltmeter may be calibrated to indicate both pulse speed and time duration of the pulse.

A circuit is now prepared to provide an indication both of the open period of the third digit pulse and also the total elapsed period of the third digit pulse. To determine the total elapsed time, key contacts K33 are closed and contacts K34 are opened. A circuit may now be traced from ground (+) through contacts 343, capacitor C32, resistor R31, contacts 341 and key contacts K33 to the floating grid G61 in the vacuum tube voltmeter. Capacitor C32 is not discharged because the grid is open (or stated otherwise, there is no grid leak path) and the charge on grid G61 causes a proportionate deflection on the meter M61. The upper scale on the vacuum tube voltmeter (Fig. 7) is preferably arranged to indicate the charge stored on capacitor C32 in terms of pulse duration or milliseconds, while the lower scale preferably indicates the charge stored in terms of rate of speed, or pulses per second. After the reading has been taken, key contacts K33 are opened and key contacts K34 are closed; key contacts K31 are also closed. At this time a circuit is completed from ground (+) on contacts 334 through capacitor C31, resistor R33, contacts 332, K31 and K34 to floating grid G61 where the vacuum tube voltmeter is caused by the stored charge to deflect and indicate the duration of the open period (*c* to *d*, Fig. 1) in terms of milliseconds. Thus, it is seen that a complete analysis of the third pulse is provided.

*Reset.*—After the readings have been taken the test man operates talk key 204, thus energizing answer relay 250. Contacts 251 open to remove the ground (+) connection from master ground conductor MG. At this time, all of the relays in the pulse analyzer circuit except calling bridge relay 270 and release delay relay 310 are released and the circuit is returned to normal. Capacitor C31 is discharged when relay 360 releases and closes its contacts 363 and when relay 330 releases and closes its contacts 333. Capacitor C32 is discharged when relay 340 releases to close its contacts 342 and relay 360 releases to close its contacts 365.

*Party identification pulse analyisis*

It is necessary to identify which party on a party line is making a telephone call if completely automatic toll ticketing is to be provided without the intervention of an operator. Party line identification may be provided by connecting ground (+) at the subscriber station to the loop including conductors T and R. Usually, this ground may be applied by the subscriber dial and takes either of two forms. One form depends upon an identification pulse having specific characteristics such as duration, percent make and the like, while the other form depends solely upon the fact that a pulse either appears or does not appear between dial pulse trains. For example, for apparatus capable of producing and applying to the line this last type of identification pulses, see Patent 2,691,070, granted October 5, 1954, to F. A. Morris and Patent 2,691,071, granted October 5, 1954, to G. W. MacCheyne. Both the Morris and the MacCheyne patents are assigned to the assignee of the present application. The subject circuit is provided with means of analyzing either form of party identification pulses. In a system using the first form of identification pulse, charges are stored on capacitors C31 and C32 as an indication of the pulse characteristics, while in a system using the second form of identification pulse a light flashes to indicate the presence or absence of the identification pulse.

As a preliminary to the identification pulse analysis the test man restores the talk key to normal and closes party identification key contacts 204*a*. Relay 210 operates over a circuit which may be traced from (−) battery through the winding of relay 210, contacts 204*a* and contacts 204*b* to ground (+). When relay 210 operates, it in effect substitutes identification pulse relay 230 for calling bridge relay 270 by disconnecting contacts 271, 273 and 274 and substituting therefor contacts 231, 232 and 233 respectively. Calling bridge relay 270 operates in series with relay 230; therefore, there is no need to provide a substitute for contacts 272.

The identification pulse comprises a ground marking connected to both the tip and ring conductors T and R at the subscriber station by any suitable means (not shown). Usually, identification pulse relay 230 is differentially energized in series with calling bridge relay 270 when contacts 212 and 213 are open. When ground (+) is applied to the loop, one winding of relay 230 is shunted. Assuming that there has been no answer supervision and that the contacts of answer relay 250 are in their normal positions, the upper winding of relay 230 is shunted by the circuit which extends from ground (+) through the upper winding of relay 270, contacts 253, the upper winding of relay 230, conductor T, brush 205, and the switch train to the party identifying ground applied at the subscriber station. At this time relay 230 is no longer differentially energized; therefore, it operates over the circuit which may be traced from (−) battery through the lower winding of calling bridge relay 270, rest contacts 256, the lower winding of differential relay 230, conductor R and brush 206 to the party identifying ground via the switch train. When relay 230 operates, it closes its contacts 231 thereby causing pulsing relay 320 to operate via the path from (−) battery through the winding of relay 320, contacts 317 and 231 to ground (+). If the first identifying pulse is to be analyzed, contacts K45 of a suitable key are operated to energize marking relay 420. In this case the first pulse controls the charging of capacitors C31 and C32 in exactly the manner described above with respect to digit pulses except that charging is now under the control of contacts 232 and 233 instead of contacts 273 and 274, respectively.

In case that testing is merely to determine the presence or absence of an identifying pulse, the person at the substation is instructed to dial a certain number of times. Relay 230 operates and releases each time that there is an identification pulse. The circuit functions as in the case of testing digit pulses. Each time that relay 330′ and 350 release following an identification pulse, lamp L43 flashes because relay 420 operates and releases, there having been one pulse. This circuit for relay 420 is completed during the slow release time of relay 350 and includes contacts 414, 352, 336′, 316 and 251. Thus, the maintenance man has only to count the number of times that lamp L43 flashes to know how many party identifying pulses are received.

*Miscellaneous*

The details of the vacuum tube voltmeter are conventional; therefore, they have not been described in detail. The principal reason for using a voltmeter of this type is that grid G61 is floating and has no grid leak or other path connected thereto. For this reason, the capacitor will not discharge when it is connected with the voltmeter.

While I have shown and described a single embodiment of my invention, I intend to claim all modifications which may fall within the true spirit of my invention. For example, it would be possible to provide a series of counting and marking relays or other means for analyzing each of a plurality of party identification pulses.

What I claim is:

1. A pulse analyzer circuit for a telephone system comprising means for receiving a plurality of digit pulses, each of said digit pulses comprising a make portion and a break portion, means for predetermining one of said digit pulses for analysis, means for measuring the complete duration of said predetermined digit pulse, means for measuring the duration of one of said portions of said predetermined digit pulses, and means for comparing said measurement of the duration of said complete digit pulse and said measurement of the duration of said portion of said digit pulse.

2. The pulse analyzer circuit of claim 1 and means for receiving party identification pulses, and means for measuring the time duration of said party identification pulse.

3. The pulse analyzer circuit of claim 1 and means for indicating either of said measurements in terms of time duration or of pulse speed.

4. A pulse analyzer circuit, means for transmitting a plurality of digit pulses into said pulse analyzer circuit, each of said digit pulses comprising a make portion and a break portion, relay means connected to be operated by said make portions and released by said break portions, means for predetermining one of said pulses for analysis, a pair of capacitors, means utilizing said relay for charging one of said capacitors continuously from the beginning of one of said portions of said predetermined digit pulse until the end of the other of said portions of said predetermined digit pulse, and other means utilizing said relay for charging the other of said capacitors only during one of said portions of said predetermined digit pulse.

5. The pulse analyzer circuit of claim 4 and means for transmitting at least one party identification pulse into said pulse analyzer circuit, and a differential relay connected in parallel with said relay means to be operated responsive to said identification pulses for analyzing the characteristics of said identification pulse.

6. The pulse analyzer circuit of claim 5 and means for reoperating said means for predetermining one of said pulses to indicate which of a plurality of said identification pulses is to be analyzed.

7. A pulse analyzer circuit comprising a chain of marking relays, a bridge relay having at least a set of make contacts and a set of break contacts, means for transmitting a train of digit pulses into said pulse analyzer circuit, each of said digit pulses comprising a break period and a make period, means for releasing and for reoperating said bridge relay responsive to the receipt of each of said digit pulses, means for operating said chain of marking relays responsive to a train of digit pulses to indicate which predetermined pulse in a subsequent train of digit pulses is to be analyzed, means for transmitting said subsequent train of digit pulses to said pulse analyzer circuit, two time measuring means, means responsive to the beginning of said predetermined digit pulse as indicated by operation of said break contacts for initiating the measurement of a time period on both of said time measuring means, means responsive to the termination of one of said periods of said predetermined digit pulse as marked by the opening of said break contacts for terminating said time measurement on one of said time measuring means, and means responsive to the termination of the other one of said periods of said predetermined digit pulse as marked by opening of said make contacts for terminating said time measurement on the other of said time measuring devices.

8. A pulse analyzer circuit comprising a pair of talking conductors, means for transmitting a plurality of digit pulses over said talking conductors, a relay connected in bridge across said talking conductors to operate during the make period of each of said digit pulses and to release during the break period of each of said digit pulses, said relay having at least a set of make contacts and a set of break contacts, means for indicating a particular one of said digit pulses for analysis, two time measuring devices comprising a pair of capacitors, means for initiating the start of time measurement at the beginning of said particular pulse comprising a circuit including said contacts for initiating the storage of a charge on each of said capacitors, means responsive to the opening of said break contacts during said particular pulse period for terminating the storage of said charge on one of said capacitors, and means responsive to the opening of said make contacts at the termination of said particular pulse for terminating the storage of a charge on the other of said capacitors.

9. The pulse analyzer circuit of claim 8 and a vacuum tube voltmeter, a floating grid in said vacuum tube voltmeter, means for connecting either of said charged capacitors to said floating grid, and means for indicating said charge either in terms of milliseconds or in terms of pulse speed.

10. The pulse analyzer circuit of claim 9 and a differential relay connected to said talking conductors in parallel with said bridge relay, means responsive to party identification pulses for operating and releasing said differential relay, said differential relay having at least a set of make contacts and a set of break contacts, and means for effectively substituting said make and said break contacts on said differential relay for said make and said break contacts, respectively, on said bridge relay.

11. The pulse analyzer circuit of claim 10 and means for operating said indicating means to indicate a particular one of said party identification pulses for analysis, when said differential relay responds to said identification pulses.

12. A pulse analyzer circuit comprising relay means operative between at least two positions, means for connecting said relay means to repeat digit pulses, said relay means comprising at least a first set of contacts which are closed when said relay means is in one of said positions and a second set of contacts which are closed when said relay means is in the other of said positions, two capacitors, means responsive to the operation of said relay means to one of said positions for initiating a charging of both of said capacitors, means responsive to an operation of said first set of contacts for terminating the charge being applied to one of said capacitors, and means responsive to an operation of said second set of contacts for terminating the charge being applied to the other of said capacitors.

13. The pulse analyzer circuit of claim 12 and a differential relay operative between at least two positions, means for connecting said differential relay to repeat party identification pulses, said differential relay comprising at least a first set of contacts which are closed when said differential relay is in one of said positions and a second set of contacts which are closed when said differential relay is in the other of said positions, means for effectively substituting said contacts of said differential relay for the corresponding contacts of said relay means, and means for transmitting a plurality of party identification pulses to said pulse analyzer circuit to control said differential relay.

14. A pulse analyzer circuit comprising relay means operative between at least two positions, means for connecting said relay means to repeat digit pulses, said relay means comprising at least one set of contacts which are closed when said relay means is in one of said positions and another set of contacts which are closed when said relay means is in the other of said positions, two capacitors, means responsive to the operation of said relay means to one of said positions for initiating a charging of both of said capacitors, means responsive to a movement of a first of said sets of contacts for terminating the charge being applied to one of said capacitors, means responsive to a movement of a second of said sets of contacts for terminating the charge being applied to the other of said capacitors, and marking means for causing a particular digit pulse in a train of digit pulses to be effective for controlling said charging of both of said capacitors.

15. The pulse analyzer circuit of claim 14 and a differential relay operative between at least two positions, means for connecting said differential relay to repeat party identification pulses, said differential relay comprising at least a first set of contacts which are closed when said differential relay is in one of said positions and a second set of contacts which are closed when said differential relay is in the other of said positions, means for effectively substituting said contacts of said differential relay for the corresponding contacts of said relay means, means for transmitting a plurality of party identification pulses to said pulse analyzer circuit to control said differential relay, and means for operating said marking means for causing a particular identification pulse to be effective for controlling said charging of both of said capacitors when said differential relay responds to said identification pulses.

References Cited in the file of this patent

UNITED STATES PATENTS 2,617,896 Kessler ---------------- Nov. 11, 1952